US006662076B1

(12) United States Patent
Conboy et al.

(10) Patent No.: US 6,662,076 B1
(45) Date of Patent: Dec. 9, 2003

(54) MANAGEMENT OF MOVE REQUESTS FROM A FACTORY SYSTEM TO AN AUTOMATED MATERIAL HANDLING SYSTEM

(75) Inventors: Michael R. Conboy, Austin, TX (US);
Russel Shirley, Pflugerville, TX (US);
Jason Grover, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/247,659

(22) Filed: Feb. 10, 1999

(51) Int. Cl.[7] .................................................. G06F 7/00
(52) U.S. Cl. ................... 700/214; 700/121; 700/216; 700/228; 700/241; 414/935; 414/940
(58) Field of Search ............................ 700/112, 214, 700/121, 213, 228, 229, 230, 218, 241; 414/935, 800, 940

(56) References Cited

U.S. PATENT DOCUMENTS

| 4,829,445 A | * | 5/1989 | Burney ......................... 700/230 |
| 5,551,830 A | * | 9/1996 | Watanabe et al. ............ 414/786 |
| 5,658,123 A | | 8/1997 | Goff et al. .................... 414/805 |
| 5,696,689 A | * | 12/1997 | Okumura et al. ............ 700/121 |
| 5,751,581 A | | 5/1998 | Tau et al. ..................... 700/115 |
| 5,838,566 A | * | 11/1998 | Conboy et al. ............... 700/115 |
| 5,838,572 A | * | 11/1998 | Hofstetter et al. ........... 700/213 |
| 5,892,979 A | * | 4/1999 | Shiraki et al. ................ 395/872 |
| 5,924,833 A | * | 7/1999 | Conboy et al. ............... 414/217 |
| 5,972,727 A | * | 10/1999 | Ryan et al. ..................... 438/14 |
| 5,975,740 A | * | 11/1999 | Lin et al. ......................... 700/99 |
| 6,035,245 A | * | 3/2000 | Conboy et al. ............... 700/214 |
| 6,038,490 A | * | 3/2000 | Dimitri et al. ................ 700/214 |
| 6,108,585 A | * | 8/2000 | Ryan et al. .................... 700/112 |
| 6,131,052 A | * | 10/2000 | Ban et al. ....................... 700/121 |
| 6,157,866 A | * | 12/2000 | Conboy et al. ............... 700/121 |
| 6,240,335 B1 | * | 5/2001 | Wehrung et al. ............. 700/230 |
| 6,336,204 B1 | * | 1/2002 | Jevtic .............................. 716/1 |
| 6,411,859 B1 | * | 6/2002 | Conboy et al. ............... 700/101 |
| 2002/0138172 A1 | * | 9/2002 | Bahri et al. ................... 700/217 |

* cited by examiner

Primary Examiner—Emanuel Todd Voeltz
Assistant Examiner—Ronald D Hartman, Jr.

(57) ABSTRACT

Management of move requests from a factory system to an automated handling system (AMHS) is provided. In one embodiment, a method and system is provided which includes receiving a move request from the factory system and selectively passing the move request to the AMHS based on a comparison of the move request with one or more conditions of the AMHS. The move request may be selectively passed to the AMHS by, for example, passing the move request to the AMHS without modification, changing a destination tool identified in the move request and/or delaying the move request, or canceling the move request. By selectively passing the move request based on conditions of the AMHS, move requests can more efficiently be managed and the throughput of the automated material handling system can be increased.

36 Claims, 5 Drawing Sheets

MANAGEMENT OF MOVE REQUESTS FROM A FACTORY SYSTEM TO AN AUTOMATED MATERIAL HANDLING SYSTEM

FIELD OF THE INVENTION

The present invention generally relates to manufacturing systems including automated material handling systems and, more particularly, to the management of move requests from a factory system to an automated material handling system.

BACKGROUND OF THE INVENTION

Systems which handle material, such as manufacturing facilities, often employ automated material handling systems to move various materials from one location to another location within the system. The materials may include raw materials, finish product materials, or any materials inbetween. One example of such a manufacturing facility is a semiconductor fabrication facility.

A typically semiconductor fabrication facility includes multiple factory tools interconnected by one or more paths, such as conveyor belts. Factory tools may include storage tools, such as stockers or WIP racks, and processing tools, for example. Each of the processing tools is used to carry out a particular process step on the semiconductor wafers. Exemplary processing tools include photolithography tools, chemical mechanical polishing tools and chemical vapor deposition tools, for example. The wafers are typically stored in and moved about through fabrication facility using material carriers, such as cassettes. The wafers are typically divided into identifiable lots each of which undergo a particular processing sequence. Each of the cassettes or material carriers also includes an identification tag for identification.

A typical semiconductor fabrication facility usually includes a factory system for generating wafer lot move requests and an automated material handling system (AMHS) for handling the move requests. The factory system typically stores a processing sequence for each wafer lot and sends requests to move the wafer lot to the AMHS based on the position of the wafer lot within its fabrication sequence. The AMHS typically includes a controller associated with each of the storage tools, for example. Typically the move requests from the factory system identify a particular wafer lot and a destination tool for the wafer lot. The move request is forwarded to the controller associated with the present factory tool of the wafer lot. This controller then handles the movement of the wafer lot to its destination tool. This typically includes reserving a place in the destination factory tool for a cassette carrying the wafer lot and placing the cassette carrying the wafer lot onto one or more paths for transportation of the wafer lot to the destination tool.

As semiconductor wafers increase in complexity, the manufacturer of such materials also increases. For example, different types of fabrication sequences may be employed and thus a higher number of wafer lots may be processed in a factory and a larger number of cassettes may be used in the factory. The additional wafer lots and cassettes increase the complexity of the fabrication process and place additional burdens on the AMHS. This increases the propensity of the wafers and wafer carriers back up or "log jam". These log jams severely reduce the throughput of semiconductor wafers. As less throughput is of high concern for manufacturers, method and systems which reduce log jams are in continual need.

SUMMARY OF THE INVENTION

The present invention generally relates to the management of move requests from a factory system to an automated material handling system (AMHS). In one embodiment, a method is provided which includes receiving a move request from the factory system and selectively passing the move request to the AMHS based on a comparison of the move request with one or more conditions of the AMHS. The move request may be selectively passed to the AMHS by, for example, passing the move request to the AMHS without modification, changing a destination tool identified in the move request and/or delaying the move request, or canceling the move request.

A manufacturing system in accordance with one embodiment of the invention includes an AMHS which moves material around a factory and a factory system for generating move requests for moving material. The manufacturing system further includes a broker system coupled to the factory system and the AMHS for receiving a move request from the factory system and selectively passing the move request to the AMHS based on a comparison of the move request with one or more conditions of the AMHS. By selectively passing the move request based on conditions of the AMHS, move requests can more efficiently be managed and the throughput of the automated material handling system can be increased.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
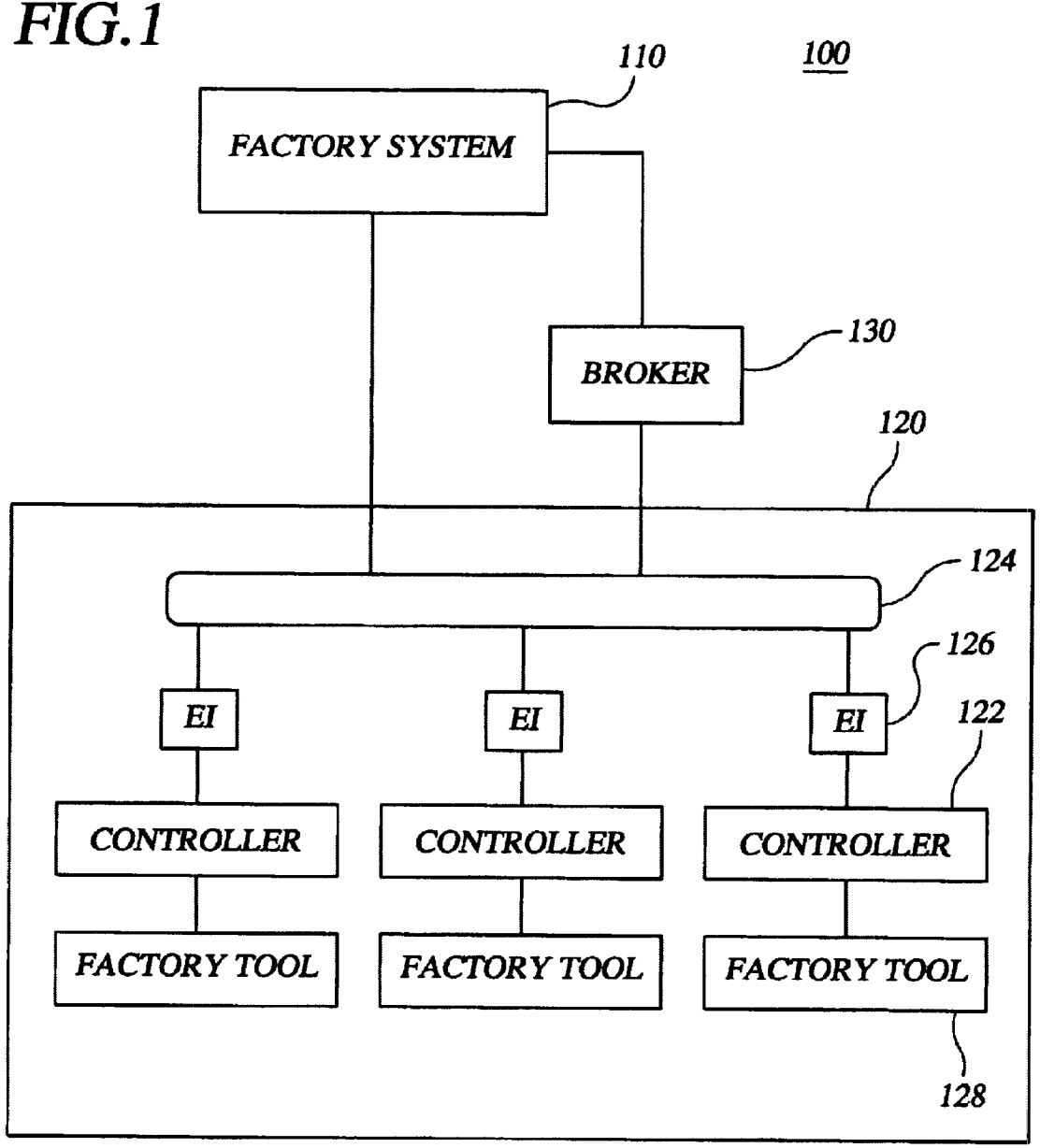
FIG. 1 illustrates an exemplary manufacturing system in accordance with one embodiment of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention generally provides systems and methods for managing move requests from a factory system to an automated material handling system (AMHS). The AMHS and factory system may be tailored for the fabrication of semiconductor wafers. While the invention is not so limited, a more detailed understanding of the invention will be gathered from a description of exemplary embodiments which follows.

FIG. 1 illustrates an exemplary manufacturing system in accordance with one embodiment of the invention. By way of reference and not of limitation, the discussion which follows will relate to a manufacturing system for a semiconductor factory. The exemplary system 100 includes a factory system 110 for generating move requests for material (e.g., wafer lots) within the factory and an AMHS 120 for controlling the movement of the material between tools 128, such as stockers, in the factory. While not shown, the factory tools 128 are typically interconnected by a transportation system, which typically includes one or more paths. The factory tools 128 typically include storage tools, such as stockers, and may also include other tools such as WIP racks, or processing tools, such as CVD or CMP tools, for example. In accordance with one aspect of the invention, the manufacturing system 100 further includes a broker 130 which interfaces with the factory system 110 and the AMHS 120 and manages move requests from the factory system 110 to the AMHS 120. As will be discussed in detail below, the broker 130 generally receives move requests from the factory system 10 and selectively passes the move requests to AMHS 120 based on a comparison of the move request with one or more conditions of the AMHS 120.

The factory system 110 typically stores a processing sequence for each wafer lot. Each processing sequence typically defines a sequence of processing steps which are performed on a given wafer lot for fabrication. The factory system 110 typically maintains a table of the processing steps and maps each processing step to a tool for the wafer lot necessary for processing. For example, for a given processing step, the factory system 110 may identify a particular storage tool for holding the wafer lot prior to processing. The factory system 110 typically generates move request for moving the wafer lots around the factory in accordance with the particular processing sequence for a wafer lot. The factory system 110 typically receives updates from the AMHS 120 when a tool 128 performs an event on a wafer lot. For example, a storage tool controller 122 may ask the factory system 110 how to handle a wafer lot which has just been received at its input port. In response, the factory system 110 may generate a move request for the tool, requesting that the lot be moved to a destination tool, such as another stocker. The destination tool may be determined by the factory system 110 based on the table and mapping discussed above. Each of the move requests typically identifies a wafer lot and a destination tool for the wafer lot. In many applications, wafer lots are also given a priority (e.g., a value indicating the wafer lot's priority relative to other wafer lots).

The AMHS 120 typically handles move requests received from the factory system 110 via the broker 130. As will be discussed below, the AMHS 120 may also receive move requests from the factory system 110 which effectively bypass the broker 130. The example AMHS 120 includes a plurality of controllers 122 connected to a network 124. Each of the controllers 122 controls the operation of one or more factory tools 128. While illustrated separately, most or all of the functionality of a controller typically resides on an associated tool. An equipment interface (EI) 126 is typically provided between the network 124 and one or more controllers 122. Each EI 126 typically handles the exchange of messages, including move requests, between its controller(s) and the broker 130 and factory system 110. This typically includes translating messages into proper format for the factory system 110 and the controller 122.

Each controller 122 typically receives move requests via an EI 126 and handles the move requests. Handling of a move request by a controller 122 may include, for example, reserving a space in a destination tool identified in a move request, identifying the wafer carrier associated with the wafer lot identified in the move request, and handling the transfer of the wafer carrier to the destination tool. The latter step typically includes scheduling and transferring the wafer carrier onto one or more paths or tracks which carry the wafer carrier to the destination tool. The illustrated AMHS 120 is provided by way of example only. Operation of the AMHS may be changed without departing from the scope of the invention. For example, the EIs may be omitted and/or their functionality incorporated into the controllers 122.

Figure 2:
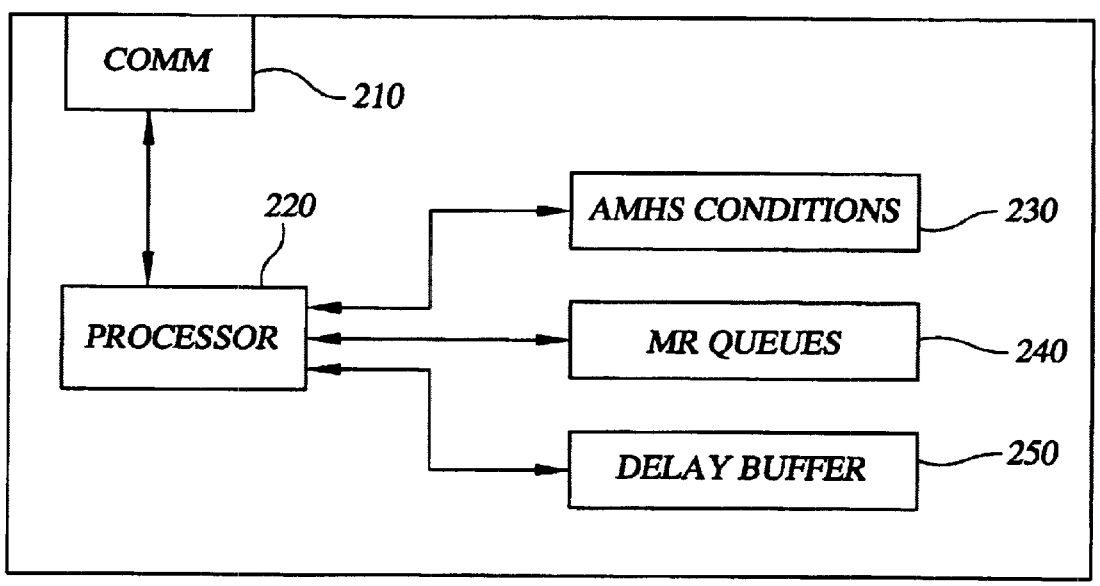
FIG. 2 illustrates an exemplary broker system in accordance with one embodiment of the invention.

FIG. 2 illustrates details of an exemplary broker in accordance with one embodiment of the invention. The exemplary broker system 200 includes a communicating component 210 for handling communications between the broker 200 and a factory system and AMHS and a processor 220 for receiving move requests and selectively passing move requests to the AMHS. The exemplary broker 200 also includes a memory arrangement 230, such as a database, which stores conditions of the AMHS and move request queues 240 which store move requests for the factory tools. The broker 200 may also include a delay buffer 250 for storing delayed move requests. The broker 200 may be associated with each factory tool in the factory or may be selectively interfaced with the factory tools. Typically the broker 200 stores in memory a set of operating parameters indicating the factory tools with which it is associated. The parameters may, for example, identify which EIs the broker is associated with. These parameters may be set by a system administrator or operator and may be changed during operation. Where selectively interfaced, move requests from the factory system effectively bypass the broker 200 and are provided directly to an EI and/or tool regardless of the conditions of the AMHS.

The AMHS conditions database 230 may include a wide variety of information related to the AMHS. The database 230 may, for example, store the following conditions: a value indicating that a factory tool is down or inoperable; a value indicating length of time for which a tool will be down or inoperable; a value indicating the capacity of a tool, a value indicating the number of active requests for a particular EI; a value indicating that a particular track is full. The AMHS conditions stored by the broker 200 may be provided in a number of different manners. For example, AMHS conditions may be automatically provided from the AMHS or may be input by an operator or system administrator. In the former case, an AMHS tool may determine its condition and update the AMHS conditions database 210 accordingly. Systems, which may be external to the AMHS, may also provide AMHS conditions. For instance, an external particle may provide data related to the quantity or rate of certain particles in an area associated with a tool, such as a stocker. This data may be stored as an AMHS condition related to the stocker and used in move request management.

The move request queues 240 typically include an active queue and a pending queue for each tool with which the broker is associated. In the example embodiment an active queue and pending queue are maintained for each EI. In other embodiments, these queues may be maintained on an individual tool/controller basis. The active queue for each EI typically includes move requests that have been or are in the process of being communicated to the associated EI for handling the requested move. The pending queue for each EI typically serves as a buffer for storing move requests waiting to be moved to the active queue. While the invention is not so limited, the active queues may be first-in-first-out (FIFO) queues and the pending queues may be dynamic queues. The use of dynamic pending queues can, as discussed below, allow the reordering of pending requests.

The broker 200 typically maintains an active queue limit for each EI. When the active queue limit for a particular EI is reached, subsequent move requests for the EI are placed in the EI's pending queue. The active queue limit for a particular EI is typically set by a system administrator or operator and may vary from EI to EI. For example, EI's associated with a large number of tools and/or which may process a higher rate of move requests, typically have a larger active queue limit.

Figure 3:
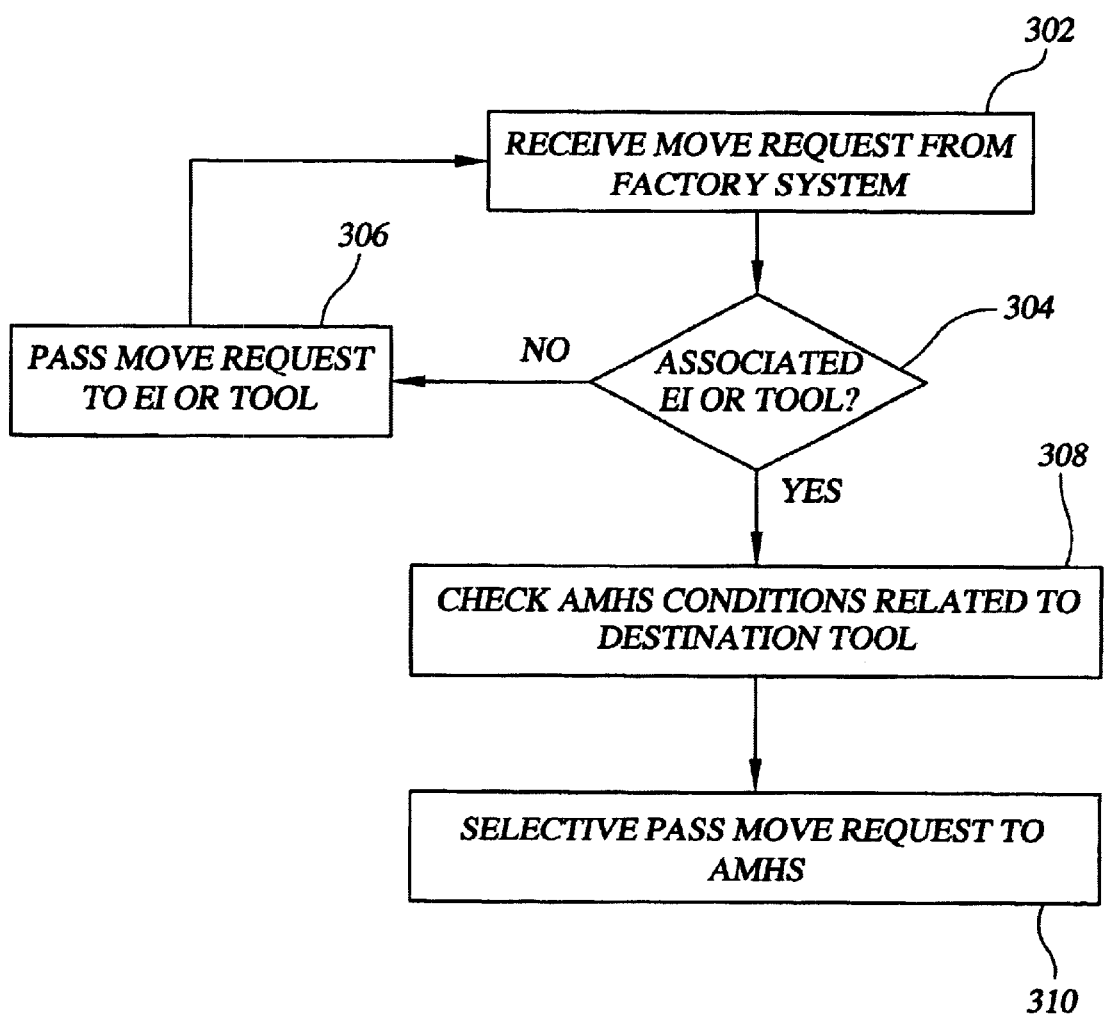
FIG. 3 is a flow chart illustrating an exemplary process in accordance with one embodiment of the invention.

FIG. 3 is a flow chart illustrating an exemplary process for managing move requests between a factory system and an AMHS. At block 302, a broker receives a move request from the factory system. The move request typically identifies a particular wafer lot, the EI associated with the tool having the wafer lot, and a destination tool for the wafer lot. Where EIs are associated with more than one tool, the move request may also identify the tool containing the lot. After receiving the request, the broker determines whether it is associated with the EI identified in the request, as indicated at block 304. This typically includes checking the operating parameters of the broker as set by a system administrator or operator. If the broker is not associated with the identified EI, the move request is directly passed to the EI, as indicated at block 306. Control then moves to block 302 where the broker awaits the receipt of another move request from the factory system. In this manner, a move request for a selected EI may bypass the broker and pass directly to the EI.

If the broker is associated with the EI identified in the move request, the broker then checks the AMHS conditions related to the destination tool identified in the move request, as indicated at block 308. The broker may, for example, query the AMHS database 210 to determine if the destination tool is down or inoperable, the length of time with which it will be down, if the destination tool is full, if the active queue of the designated EI exceeds a particular threshold, and/or if a track to the tool is full.

The broker then selectively passes the move request to the AMHS based on the comparison of the move request to the one or more conditions of the AMHS as indicated at block 310. The broker may also take into consideration the priority of the lot identified in the move request. The broker may selectively pass a move request in a number of different manners. The broker may selectively pass the move request by passing the move request to the AMHS without modification. For example, if a destination stocker is not full and the track to the stocker is not full, the move request may pass without modification; The broker may selectively pass the move request by: modifying the move request and passing the modified move request to the AMHS. Modifying may, for example, include changing the destination tool identified in the move request and/or delay the passing of the move request to the AMHS for a period of time. For example, where the broker determines that a destination stocker is full, the broker may change the destination tool to another stocker. In such a case, the broker may store the original move request and, after a period of time, send the original move request to the AMHS. As another example, if a check of the AMHS conditions reveals that a track to the desired location is currently full, the broker may change the destination tool to a tool associated with a different track and/or delay the passing of the move request to the AMHS for a period of time to enable the bubble in the track to ease. The broker may also selectively pass the move request by canceling the move request. Such a technique may, for example, be beneficial where the AMHS conditions reveal that the current location of the wafer lot is optimal.

Passing a move request to the AMHS typically includes sending the original or a modified move request (hereinafter a move request) to the identified EI. In accordance with a further aspect of the invention, selective passing of a move request further includes storing the move request in a move request queue for the identified EI.

Figure 4:
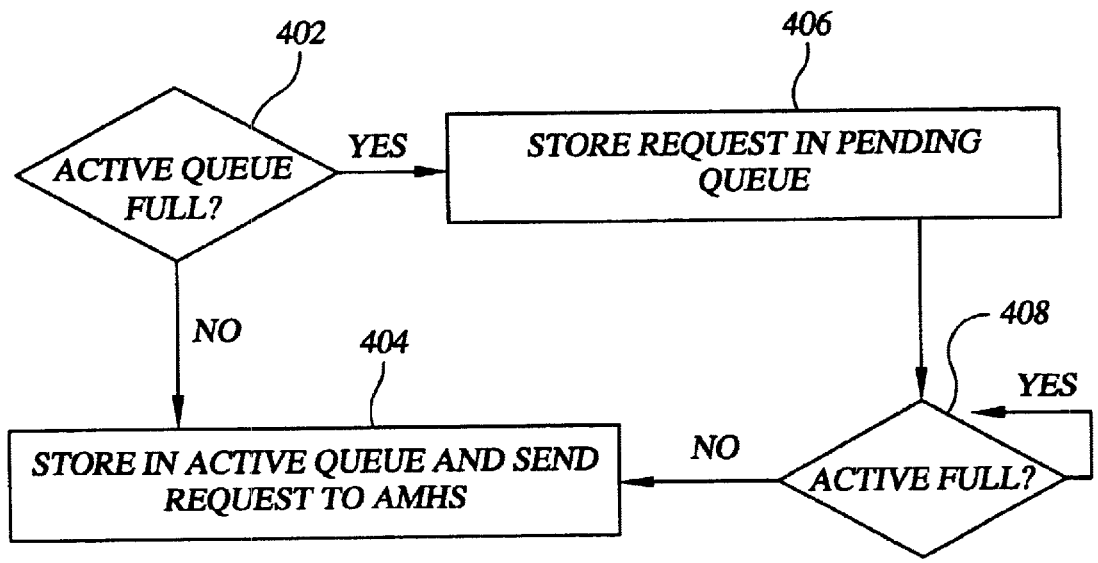
FIG. 4 is a flow chart illustrating an exemplary process in accordance with another embodiment of the invention.

FIG. 4 is a flow chart illustrating exemplary queuing process in accordance with the invention. At block 402, the broker determines whether the active queue for the identified EI is full. If not, the move request is stored in the active queue for the identified EI and sent to the EI for communicating to the controller of the tool with the wafer lot, as indicated at block 404. If the active queue is full, the broker stores the move request in the pending queue for the identified EI, as indicated at block 406. The move request may be stored in the pending queue based on, for example, the priority of the wafer lot identified in the request. For example, wafer lots of higher priority may be positioned closer to the front of the queue. The broker may then check whether the active queue is full for the particular EI, as indicated at block 408. This may be done, for example, after the broker receives confirmation that a move request in the active queue has been executed or removed from the active queue. If the active queue is not full, the move request is then moved from the pending queue to the active queue and sent to the identified EI, as indicated at block 404.

A broker may also respond to changes in the priority of a wafer lot. For instance, in some cases, the priority of a particular wafer lot may be changed by the factory system during processing. The broker may respond to such a change by determining whether the particular wafer lot is associated with a pending request and, if so, the broker may reorder the pending queue holding the pending request. For example, if a move request for a certain wafer lot is in a pending queue at position 10 and the priority of the lot changes from normal to high, the broker may reorder the move request in the pending queue to increase the priority of the move request (e.g., to position 1–9).

Figure 5:
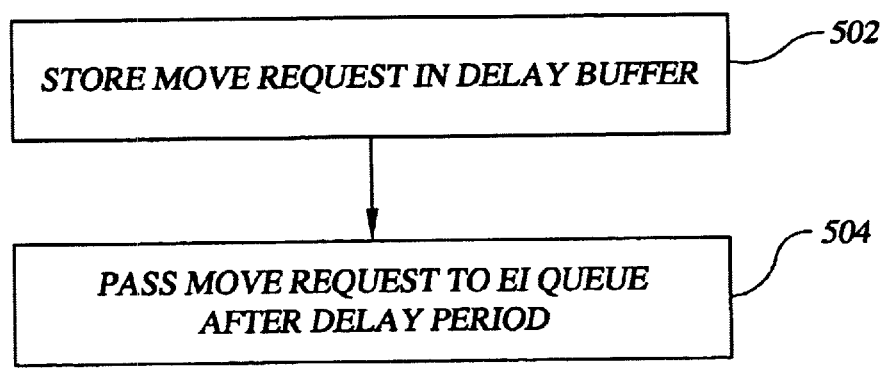
FIG. 5 is a flow chart illustrating an exemplary process in accordance with yet another embodiment of the invention.

As noted above, the broker may also delay a move request to a particular destination tool. FIG. 5 illustrates an exemplary process for delaying a move request. At block 502, the broker stores the move request in a delay buffer. The broker typically associates the move request with a delay time period based on the one or more AMHS conditions which invoked the delay. For example, where a tool or track will be down for a certain time, the delay period may be set to expire after the certain time. After the delay runs, the move request is then stored in the identified EI queue, as indicated at block 504. This typically includes performing the process indicated in FIG. 4.

Figure 6:
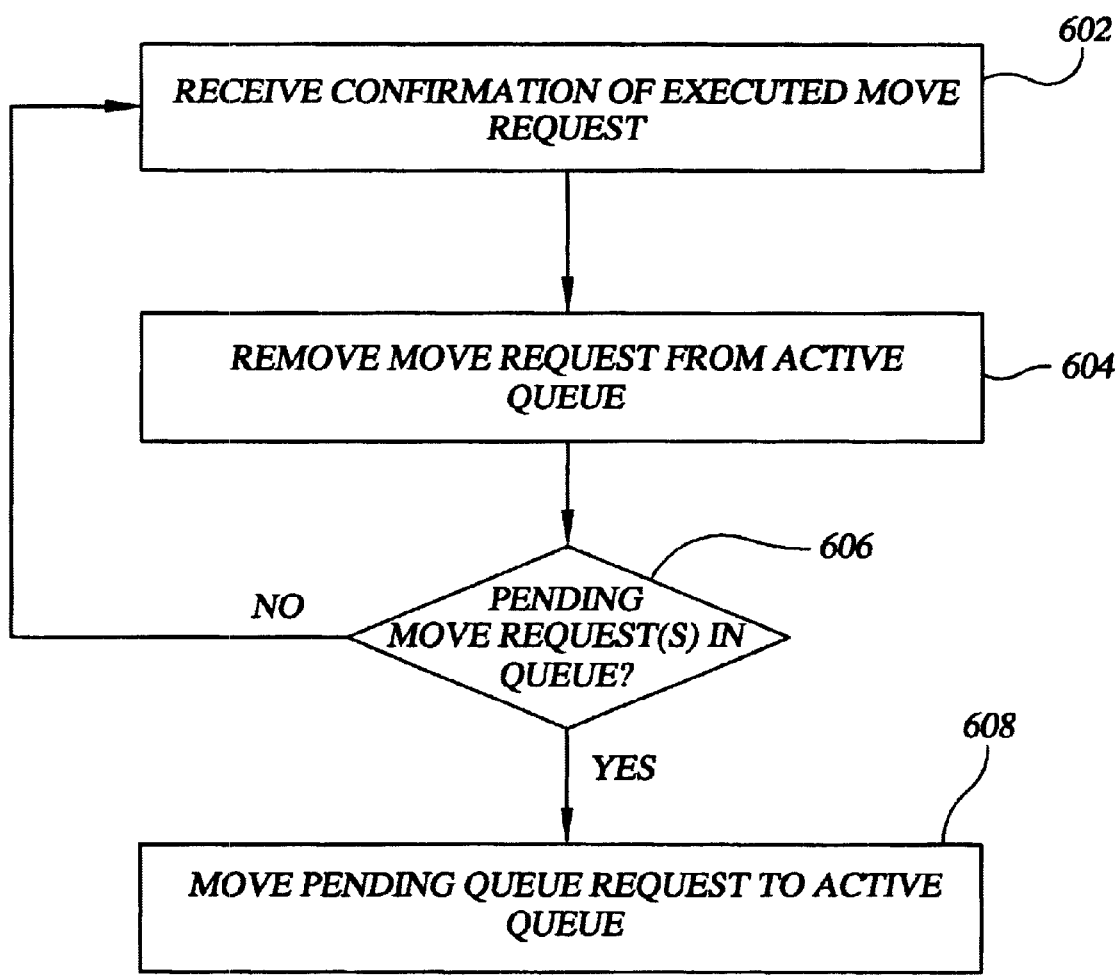
FIG. 6 is a flow chart illustrating an exemplary process in accordance with still another embodiment of the invention.

FIG. 6 illustrates another exemplary process in accordance with the invention. At block 602, the broker receives a confirmation of an executed move request. The confirmation typically is sent from the EI associated with source tool (e.g., the tool out of which a wafer lot is transferred) after it receives a confirmation from the EI of a destination tool (e.g., the tool receiving the lot) of the execution of a particular move. After receiving the confirmation, the broker then removes the move request from the active queue in which it resides, as indicated at block 604. The broker next checks whether there are any move requests in the pending queue of the source EI, as indicated at block 606. If not, control moves to block 602 where the broker waits to receive confirmation of an executed move request. If there are one or more move requests in the pending queue, control then moves to block 608 where the next move request from the pending queue is moved to the active queue for the source EI.

Using the above processes, move requests from a factory system to an AMHS may be efficiently managed. The above systems and methods allow for the incorporation of AMHS conditions in a determination of whether, when and/or how a move request may be forwarded to the AMHS from a factory system. This can, for example, reduce log jams in the AMHS and increase throughput. Layering of a broker between the AMHS and a factory system can, for example, also facilitate the implementation and operation of the broker. For instance, such layering can allow for modification of the functionality of the broker or AMHS with little, if any, modification of the other system. The ability to selectively use a broker with particular EI's or tools further contributes to the ease of operation and modularity of the broker.

As noted above, the present invention is applicable to a number of different factory systems and automated material handling systems. Accordingly, the present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

We claim:

1. A method of managing move requests from a factory system to an automated material handling system (AMES), comprising:
   receiving a move request, having a designated target, from the factory system; and
   selectively passing the move request to the AMHS based on a comparison of the move request with one or more conditions of the AMHS, said one or more conditions of the AMHS including that the designated target does not have an excessive number of previously received move requests that are backlogged for the designated target, the excessive number defined by a threshold limit for the designated target.

2. The method of claim 1, wherein selectively passing a move request includes passing the move request to the AMHS without modification.

3. The method of claim 1, wherein selectively passing the move request includes modifying the move request and passing the modified move request to the AMHS.

4. The method of claim 3, wherein the move request includes a destination tool and modifying the move request includes changing the destination tool identified in the move request.

5. The method of claim 4, further including storing an original move request and sending, after a period of time, the original move request to the AMHS for moving a lot identified in the original move request to the destination tool in the original move request.

6. The method of claim 3, wherein modifying the move request includes delaying the move request for a period of time and passing the modified move request includes passing the move request to the AMHS after the period of time.

7. The method of claim 1, wherein selectively passing the move request includes canceling the move request without passing the move request to the AMHS.

8. The method of claim 1, wherein the move request identifies a source tool and wherein selectively passing the move request includes storing the move request in a queue for the identified source tool.

9. The method of claim 1, wherein selectively passing the move request including storing the move request in a pending queue and the method further includes reordering move requests within the pending queue in response to a change in a priority of a wafer lot identified by the move request.

10. The method of claim 1, further including associating a broker system with selected tools and bypassing the comparison with a move request to a selected tool.

11. The method of claim 1, wherein the comparison includes a comparison of a tool identified in the move request against one or more conditions of the tool.

12. A method of managing move requests from a factory system to an automated material handling system (AMHS), comprising:
   receiving a move request from the factory system the move request including a location; and
   selectively passing the move request to the AMHS based on a comparison of the move request with one or more conditions of the AMHS, and including storing the move request in a queue for the identified location in the move request, and wherein storing the move request in the queue includes comparing a number of move requests in an active queue for a source tool against a threshold limit and storing the move request in the active queue only if the number of move requests in the active queue is equal to or less than the threshold limit.

13. The method of claim 12, wherein storing the move request in the queue includes storing the move request in a pending queue if the number of move requests in the active queue exceed the threshold limit.

14. The method of claim 13, wherein selectively passing the move request includes moving the move request from the pending queue to the active queue for the source tool when the number of move requests in the active queue falls below the threshold limit.

15. A manufacturing system for managing move requests in a factory, comprising:
   an automated material handling system (AMHS) which moves material around the factory;
   a factory system for generating move requests for moving material, each move request having a designated target; and
   a broker system coupled to the factory system and the AMHS for receiving a move request from the factory system and selectively passing the move request to the AMHS based on a comparison of the move request with one or more conditions of the AMHS, said one or more conditions of the AMHS including that the designated target does not have an excessive number of previously received move requests that are backlogged for the designated target, the excessive number defined by a threshold limit for the designated target.

16. The system of claim 15, wherein broker system selectively passes the move request by passing the move request to the AMHS without modification.

17. The system of claim 15, wherein the broker system selectively passes the move request by modifying the move request and passing the modified move request to the AMHS.

18. The system of claim 17, wherein the move request includes a destination tool and the broker system modifies the move request by changing the destination tool identified in the move request.

19. The system of claim 18, wherein the broker system stores an original move request and sends, after a period of time, the original move request to the AMHS for moving a lot identified in the original move request to the destination tool in the original move request.

20. The system of claim 19, wherein the broker system modifies the move request by delaying the move request for a period of time and passing the modified move request includes passing the move request to the AMHS after the period of time.

21. The system of claim 15, wherein the broker system selectively passes the move request by canceling the move request without passing the move request to the AMHS.

22. The system of claim 15, wherein the move request includes a destination tool and wherein the broker system selectively passes the move request by storing the move request in a queue for the destination tool in the move request.

23. The system of claim 22, wherein the broker system stores the move request in a pending queue if the number of move requests in the active queue exceed the threshold limit.

24. The system of claim 15, wherein the broker system includes a pending queue and selectively passing the move request includes storing the move request in a pending queue, wherein the broker reorders move requests within the pending queue in response to a change in a priority of a wafer lot identified by the move request.

25. The system of claim 15, wherein the move request includes a source tool and wherein the AMHS includes a plurality of tools including one or more particular tools not associated with the broker system, wherein if the source tool is one of the particular tools the move request bypasses the broker system.

26. The system of claim 15, wherein the comparison includes a comparison of a tool identified in the move request against one or more conditions of the tool.

27. A system for managing move requests in a factory, comprising:

an automated material handling system (AMHS) which moves material around the factory;

a factory system for generating move requests for moving material; and a broker system coupled to the factory system and the AMHS for receiving a move request from the factory system and selectively passing the move request to the AMHS based a comparison of the move request with one or more conditions of the AMHS, wherein the move request includes a location and wherein the broker system selectively passes the move request by storing the move request in a queue for the identified location in the move request, wherein the broker system compares the number of move requests in an active queue for the location against a threshold limit and stores the move request in the active queue only if the number of move requests in the active queue are equal to or less than the threshold limit, and wherein the broker system compares a number of move requests in an active queue for a destination tool against a threshold limit and stores the move request in the active queue only if the number of move requests in the active queue is equal to or less than the threshold limit.

28. A system for managing move requests in a factory, comprising:

an automated material handling system (AMHS) which moves material around the factory;

a factory system for generating move requests for moving material; and a broker system coupled to the factory system and the AMHS for receiving a move request from the factory system and selectively passing the move request to the AMHS based a comparison of the move request with one or more conditions of the AMHS, wherein the move request includes a location and wherein the broker system selectively passes the move request by storing the move request in a queue for the identified location in the move request, wherein the broker system compares the number of move requests in an active queue for the location against a threshold limit and stores the move request in the active queue only if the number of move requests in the active queue are equal to or less than the threshold limit, and wherein the broker system moves the move request from a pending queue to the active queue for a tool when the number of move requests in the active queue falls below the threshold limit.

29. A manufacturing system for managing move requests in a factory, comprising:

means for moving material around the factory;

means for generating move requests for moving material, each move request having a designated target; and means coupled to the moving means and the generating means, for receiving a move request from the generating means and selectively passing the move request to the moving means based on a comparison of the move request with one or more conditions of the moving means, said one or more conditions including that the designated target does not have an excessive number of previously received move requests that are backlogged for the designated target, the excessive number defined by a threshold limit for the designated target.

30. The system of claim 29, wherein the move request includes a destination tool and wherein receiving and passing means selectively passes the move request by storing the move request in a queue for the destination tool in the move request.

31. A manufacturing system for managing move requests in a factory, comprising:

means for moving material around the factory;

means for generating move requests for moving material; and means coupled to the moving means and the generating means, for receiving a move request from the generating means and selectively passing the move request to the moving means based on a comparison of the move request with one or more conditions of the moving means, wherein the move request includes a destination tool, and wherein the receiving and passing means
selectively passes the move request by storing the move request in a queue for the destination tool in the move request, and
compares the number of move requests in an active queue for the destination tool against a threshold limit and stores the move request in the active queue only if a number of move requests in the active queue is equal to or less than the threshold limit.

32. A manufacturing system for managing move requests in a factory, comprising:

means for moving material around the factory;

means for generating move requests for moving material; and means coupled to the moving means and the generating means, for receiving a move request from the generating means and selectively passing the move request to the moving means based on a comparison of the move request with one or more conditions of the moving means, wherein the move request includes a destination tool, and wherein the receiving and passing means selectively passes the move request by storing the move request in a queue for the destination tool in the move request, and stores the move request in a pending queue if a number of move requests in the active queue exceeds the threshold limit.

33. A manufacturing system for managing move requests in a factory, comprising:

means for moving material around the factory;

means for generating move requests for moving material; and means coupled to the moving means and the generating means, for receiving a move request from the generating means and selectively passing the move request to the moving means based on a comparison of the move request with one or more conditions of the moving means, wherein the move request includes a destination tool, and wherein the receiving and passing means selectively passes the move request by storing the move request in a queue for the destination tool in the move request, and moves the move request from the pending queue to the active queue for the tool when a number of move requests in the active queue falls below the threshold limit.

34. A method of managing move requests from a factory system to an automated material handling system (AMHS), comprising:

receiving a move request from the factory system, the received move request including a designated target;

providing a queue for the designated target, the queue including a number of stored move requests;

comparing the number of stored move requests in the queue to a threshold limit;

storing the received move request in the queue only if the number of move requests in the queue does not exceed the threshold limit; and using the queue, selectively passing the stored move requests to the AMHS.

35. The system of claim 34, wherein the designated target is a particular location.

36. The system of claim 34, wherein the designated target is a particular tool.

\* \* \* \* \*

UNITED STATES PATENT AND TRADEMARK OFFICE
CERTIFICATE OF CORRECTION

PATENT NO. : 6,662,076 B1 Page 1 of 1
DATED : December 9, 2003
INVENTOR(S) : Conboy et al.

It is certified that error appears in the above-identified patent and that said Letters Patent is hereby corrected as shown below:

Column 7,
Line 37, "(AMES)" should read -- (AMHS) --.

Signed and Sealed this

Eleventh Day of May, 2004

JON W. DUDAS
*Acting Director of the United States Patent and Trademark Office*